US010797360B2

(12) United States Patent
Nozaki (10) Patent No.: US 10,797,360 B2
(45) Date of Patent: Oct. 6, 2020

(54) CONTROL DEVICE FOR POWER SYSTEM WITH BATTERY AND FUEL CELL

(71) Applicant: SUBARU CORPORATION, Tokyo (JP)

(72) Inventor: Yuichiro Nozaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 83 days.

(21) Appl. No.: 15/802,201

(22) Filed: Nov. 2, 2017

(65) Prior Publication Data

US 2018/0241095 A1 Aug. 23, 2018

(30) Foreign Application Priority Data

Feb. 21, 2017 (JP) .................................. 2017-030210

(51) Int. Cl.
*H01M 10/44* (2006.01)
*H01M 10/42* (2006.01)
(Continued)

(52) U.S. Cl.
CPC .......... *H01M 10/44* (2013.01); *H01M 8/0494* (2013.01); *H01M 8/04626* (2013.01);
(Continued)

(58) Field of Classification Search
CPC .................................................... Y02T 90/34
(Continued)

(56) References Cited

U.S. PATENT DOCUMENTS 6,255,008 B1 * 7/2001 Iwase .................... B60L 58/30
429/9
6,555,928 B1 * 4/2003 Mizuno .................. B60L 58/34
290/400
(Continued)

FOREIGN PATENT DOCUMENTS

JP H 10-271706 A 10/1998
JP 2014-073003 A 4/2014
(Continued)

OTHER PUBLICATIONS

Japanese Office Action, dated Dec. 4, 2018, in Japanese Application No. 2017-030210 and English Translation thereof.
(Continued)

*Primary Examiner* — David V Henze-Gongola
(74) *Attorney, Agent, or Firm* — McGinn I.P. Law Group, PLLC.

(57) ABSTRACT

A battery system control device includes a load, a secondary battery connected to the load via a first power converter converting a voltage by a switching operation, a fuel cell, and a control unit. The battery discharges power supplied to the load. The fuel cell is connected to the load and to the battery and the first power converter, via a second power converter converting a voltage. The fuel cell generates low voltage power. The control unit charges the battery using the generated power from the fuel cell. The control unit includes fuel cell and secondary battery controllers. The fuel cell controller steps up the power generated by the fuel cell to a voltage chargeable by the battery to be supplied to the load by the second power converter. The secondary battery controller directly connects the load and the battery by stopping the switching operation of the first power converter.

14 Claims, 5 Drawing Sheets

(51) Int. Cl.
*H01M 8/04828* (2016.01)
*H01M 8/04537* (2016.01)
*H01M 16/00* (2006.01)
*H02J 7/34* (2006.01)
*H01M 10/46* (2006.01)
*H02J 7/00* (2006.01)
*H02J 1/00* (2006.01)
*H02J 7/24* (2006.01)

(52) U.S. Cl.
CPC ....... *H01M 10/425* (2013.01); *H01M 16/006* (2013.01); *H02J 1/00* (2013.01); *H02J 7/00* (2013.01); *H02J 7/0047* (2013.01); *H02J 7/0068* (2013.01); *H02J 7/24* (2013.01); *H02J 7/34* (2013.01); *H02J 7/342* (2020.01); *H01M 2250/20* (2013.01); *H02J 7/005* (2020.01); *H02J 7/0048* (2020.01); *H02J 2207/20* (2020.01); *H02J 2300/30* (2020.01); *Y02T 10/7005* (2013.01); *Y02T 90/32* (2013.01)

(58) Field of Classification Search
USPC ......................................................... 320/101
See application file for complete search history.

(56) References Cited

U.S. PATENT DOCUMENTS

| | | | |
|---|---|---|---|
| 6,847,127 | B1* | 1/2005 | Lee .............. B60L 58/34 290/40 C |
| 2003/0230443 | A1* | 12/2003 | Cramer .............. B60G 3/20 180/65.51 |
| 2017/0047603 | A1* | 2/2017 | Kazuno ............. H01M 8/04873 |

FOREIGN PATENT DOCUMENTS

| | | |
|---|---|---|
| JP | 2014-143851 A | 8/2014 |
| JP | 2014-166110 A | 9/2014 |
| JP | 2016-027534 A | 2/2016 |
| JP | 2017-037781 A | 2/2017 |

OTHER PUBLICATIONS

Japanese Office Action, dated Sep. 4, 2018, in Japanese Application No. 2017-030210 and English Translation thereof.

* cited by examiner

CONTROL DEVICE FOR POWER SYSTEM WITH BATTERY AND FUEL CELL

CROSS-REFERENCE TO RELATED APPLICATIONS

The present application claims priority from Japanese Patent Application No. 2017-030210 filed on Feb. 21, 2017, the entire contents of which are hereby incorporated by reference.

BACKGROUND

1. Technical Field

The present invention relates to a battery system and a control device for the battery system.

2. Related Art

In recent years, a battery system that includes a secondary battery, capable of discharging electric power supplied to a load, and a fuel cell, capable of generating electric power of a voltage that is lower than the voltage of the secondary battery, in which the secondary battery can be charged using the generated power from the fuel cell has been used in various devices. For instance, as described in Japanese Unexamined Patent Application Publication (JP-A) No. 2014-143851, among electric vehicles driven by the output of a drive motor driven by electric power supplied from a secondary battery, there are electric powered vehicles that can continue running while avoiding depletion of the remaining capacity (SOC: State of Charge) of the secondary battery by charging the secondary battery using generated power from a fuel cell. Such an electrically powered vehicle is also referred to as a fuel cell range extender electric vehicle. In a fuel cell range extender electric vehicle, for instance, the secondary battery is charged by an external power supply, and the fuel cell is activated in accordance with a decrease in the remaining capacity of the secondary battery while the electric vehicle is running. For this purpose, a fuel cell, capable of generating electric power of a voltage that is lower than the voltage of the secondary battery, is installed and used in the fuel cell range extender electric vehicle.

In the above-described battery system installed in a fuel cell range extender electric vehicle or the like, it is desirable to improve the charging efficiency of the secondary battery that uses generated power from the fuel cell. Specifically, in the above-described battery system, power converters capable of converting a voltage by performing a switching operation are provided in order to execute power transmission between the load, the secondary battery, and the fuel cell. For instance, the power converters may be provided in a way such as connecting one power converter with the secondary battery, and connecting another power converter with the fuel cell, respectively. Charging of the secondary battery using generated power from the fuel cell is performed by controlling the operation of these power converters.

Consequently, switching losses in the power converters may occur and make it difficult to improve the charging efficiency of the secondary battery.

SUMMARY OF THE INVENTION

It is desirable to provide a control device of a new and improved battery system capable of improving efficiency of charging a secondary battery that uses generated power from a fuel cell in a battery system that includes a secondary battery and fuel cell.

An aspect of the present invention provides a battery system control device including a load, a secondary battery, a fuel cell, and a control unit. The secondary battery is connected to the load via a first power converter capable of converting a voltage by performing a switching operation. The secondary battery is capable of discharging power supplied to the load. The fuel cell is connected to the load, and connected in parallel with the secondary battery and the first power converter, via a second power converter capable of converting a voltage by performing a switching operation. The fuel cell is capable of generating electric power of a low voltage as compared with a voltage of the secondary battery. The control unit is capable of executing a charging control mode for charging the secondary battery using the generated power from the fuel cell. The control unit has a fuel cell controller and a secondary battery controller. The fuel cell controller is configured to step up the electric power generated by the fuel cell to a voltage that is chargeable by the secondary battery, and supply the stepped-up electric power to the load side of the second power converter by causing the second power converter to perform the switching operation during execution of the charging control mode. The secondary battery controller is configured to directly connect the load side of the first power converter and the secondary battery by stopping the switching operation of the first power converter during the execution of the charging control mode.

Another aspect of the present invention provides a battery system including a load, a secondary battery, and a control device. The secondary battery is connected to a load via a first power converter capable of converting a voltage by performing a switching operation. The secondary battery is capable of discharging power supplied to the load. The fuel cell is connected to the load, and connected in parallel with the secondary battery and the first power converter, via a second power converter capable of converting a voltage by performing a switching operation. The fuel cell is capable of generating electric power of a low voltage as compared with a voltage of the secondary battery. The control device is capable of executing a charging control mode for charging the secondary battery using the generated power from the fuel cell. The control unit has a fuel cell controller and a secondary battery controller. The fuel cell controller is configured to step up the electric power generated by the fuel cell to a voltage that is chargeable by the secondary battery, and supplies the stepped-up electric power to the load side of the second power converter by performing the switching operation of the second power converter during execution of the charging control mode. The secondary battery controller is configured to directly connect the load side of the first power converter and the secondary battery by stopping the switching operation of the first power converter during the execution of the charging control mode.

DETAILED DESCRIPTION

A preferred example of the present invention will now be described in detail with reference to the accompanying drawings. In the present specification and the drawings, the same reference numerals are given to constituent elements having substantially the same functional configuration, and repeated explanations are omitted.

1. OVERVIEW OF A BATTERY SYSTEM

Figure 1:
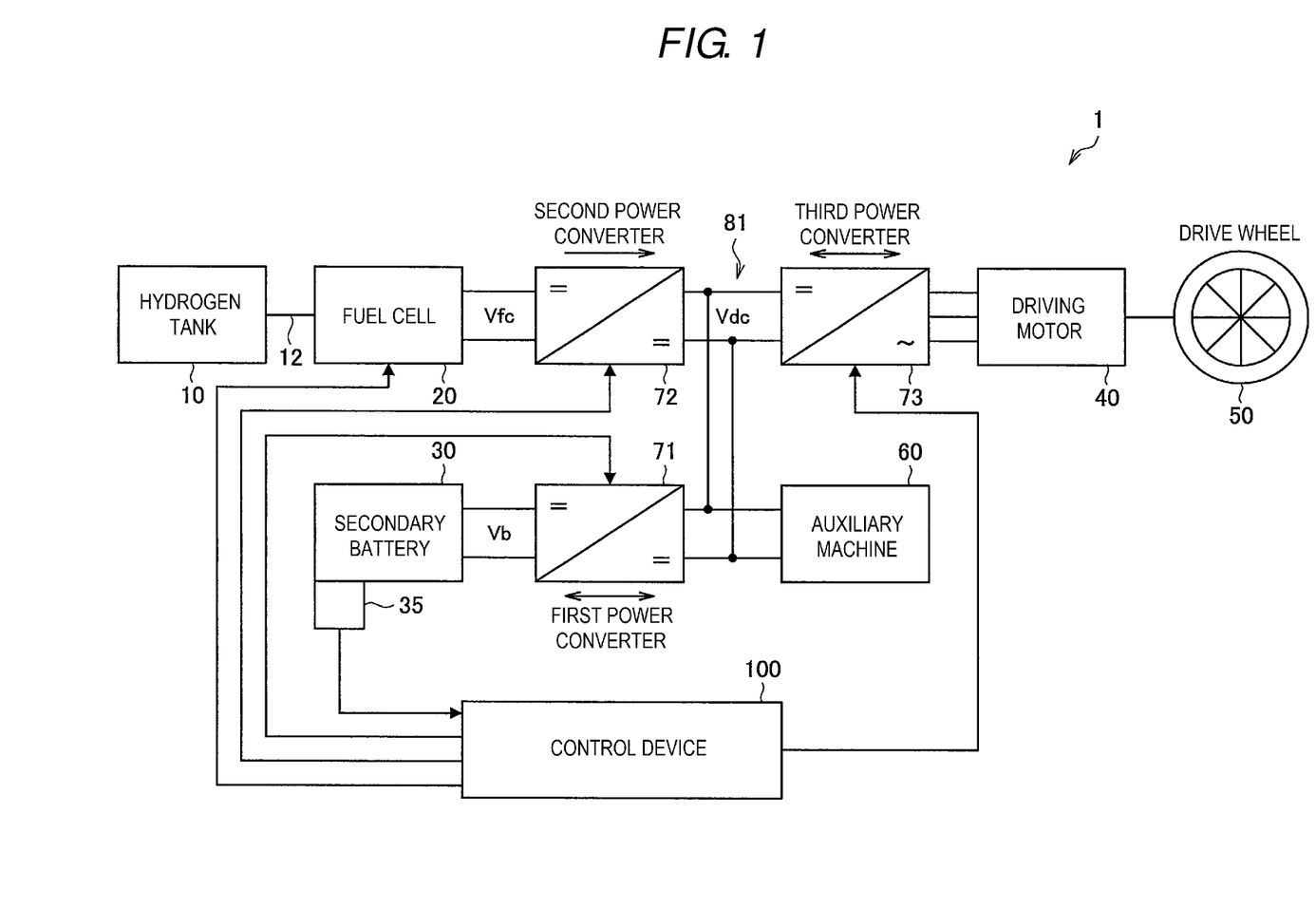
FIG. 1 is a schematic diagram illustrating an example of a schematic configuration of a battery system according to an example of the present invention.

First, referring to FIGS. 1 to 3, summary of a battery system 1 according to an example of the present invention will be described. FIG. 1 is a schematic diagram illustrating an example of a schematic configuration of the battery system 1 according to the example. The battery system 1 is the battery system installed in a fuel cell range extender electric vehicle. Hereinafter, the battery system 1 of an electric vehicle will be described as an example, but the battery system according to the example of the present invention may be applied to a device or a system different from an electric vehicle.

The battery system 1, for instance, as illustrated in FIG. 1, includes a hydrogen tank 10, a fuel cell 20, a secondary battery 30, a drive motor 40, a drive wheel 50, an auxiliary device 60, a first power converter 71, a second power converter 72, a third power converter 73, and a control device 100. The third power converter 73 and the drive motor 40 correspond to an example of a load according to the present invention.

A fuel cell range extender electric vehicle, being provided with the battery system 1, runs using a drive motor 40 driven by electric power supplied from the secondary battery 30 as a drive source. In this manner, electric power discharged by the secondary battery 30 (i.e., discharge electric power) is supplied to the drive motor 40. Further, the electric vehicle charges the secondary battery 30 using generated power from the fuel cell (hereinafter also referred to as generated power), thereby controlling depletion of remaining capacity SOC of the secondary battery 30 while continues running.

In the battery system 1, the secondary battery 30 is connected to the third power converter 73 via the first power converter 71. Further, the fuel cell 20 is connected to the secondary battery 30 and the first power converter 71, in parallel with the third power converter 73, via the second power converter 72. Further, the third power converter 73 is connected to the drive motor 40. In this manner, the secondary battery 30 is connected to the load via the first power converter 71. Further, the fuel cell 20 is connected to the secondary battery 30 and the first power converter 71, in parallel with the load, via the second power converter 72.

Hereinafter, the nodes connecting the first power converter 71, the second power converter 72, and the third power converter 73 to each other is referred to as an intermediate DC zone 81. Further, the voltage at the intermediate DC zone 81 is referred to as a DC stage voltage Vdc. The voltage on the secondary battery 30 side of the first power converter 71 is referred to as a battery voltage Vb. The battery voltage Vb corresponds to the voltage of the secondary battery 30. Further, the voltage on the fuel cell 20 side of the second power converter 72 is referred to as a fuel cell voltage Vfc.

The number of third power converters 73 connected to the intermediate DC zone 81 is not particularly limited; a plurality of third power converters 73 may be connected to the intermediate DC zone 81. The number of drive motors 40 connected to a specific third power converter 73 is not particularly limited; a plurality of drive motors 40 may be connected to the specific third power converter 73.

The drive motor 40 is driven by the supplied electric power (i.e., power running drive), and generate power (i.e., dynamic). A three-phase AC type motor can be used as the drive motor 40.

Specifically, the drive motor 40 can output power for driving the drive wheel 50 of the electric vehicle. The drive motor 40 generates the power with power running drive by being powered by the electric power supplied from the secondary battery 30. As described later, the drive motor 40 may be driven in the power running manner by using electric power supplied from the fuel cell 20 in addition to electric power supplied from the secondary battery 30. Further, the drive motor 40 may have a regenerative function as a generator that is regeneratively driven during deceleration of the electric vehicle, and generates electric power by the rotational energy of the drive wheel 50. Hereinafter, the electric power regenerated by the drive motor 40 is also referred to as a regeneratively generated electric power. The drive motor 40 may be a known drive motor 40 as long as it has the above function.

The third power converter 73 has a function as a so-called inverter and performs bidirectional power conversions from the intermediate DC zone 81 to the drive motor 40 and from the drive motor 40 to the intermediate DC zone 81.

Specifically, the third power converter 73 converts DC power supplied from the secondary battery 30 via the intermediate DC zone 81 into AC power which can be supplied to the drive motor 40. The third power converter 73 also converts the DC power supplied from the fuel cell 20 via the intermediate DC zone 81 into AC power which can be supplied to the drive motor 40. Further, the third power converter 73 converts AC power regenerated by the drive motor 40 into DC power which can be supplied to the intermediate DC zone 81. The operation of the third power converter 73 is controlled by the control device 100. Specifically, the third power converter 73 is provided with a switching element, and the operation of the switching element is controlled by the control device 100, whereby the power between the intermediate DC zone 81 side and the drive motor 40 side Is controlled. The third power converter 73 may be a known power converter as long as it has the above function.

The auxiliary device 60 are components such as various electric components, electronic equipment, air conditioning equipment and display equipment in the vehicle cabin of the electric vehicle. The auxiliary device 60 is connected to the intermediate DC zone 81 and is driven by using electric power supplied from the secondary battery 30. For instance, the auxiliary device 60 is driven at a lower rated voltage than the battery voltage Vb. In this case, the auxiliary device 60 may be connected to the intermediate DC zone 81 via a step-down converter that can step down the power supplied from the secondary battery 30 which is supplied to the auxiliary device 60.

The secondary battery 30 is a battery capable of charging and discharging electric power. Although a lithium ion battery, a lithium ion polymer battery, a nickel hydride battery, a nickel cadmium battery, or a lead storage battery can be used as a secondary battery, other batteries may also be used.

The secondary battery 30 can discharge electric power to be supplied to the load. Specifically, the secondary battery 30 is a power source of the drive motor 40 and is capable of discharging electric power supplied to the third power converter 73 and the drive motor 40. Further, the discharge power of the secondary battery 30 may be supplied to the auxiliary device 60. Further, the secondary battery 30 can be charged by using generated power from the fuel cell 20 and regeneratively generated power from the drive motor 40. Further, the secondary battery 30 may be configured to be connectable to an external power supply or an external charging device via a charging circuit and a connector, which are not shown, or may be charged using an external power system.

A battery management device (BMS: Battery Management System) 35 is provided to the secondary battery 30. The battery management device 35 calculates information such as the battery voltage Vb and the remaining capacity SOC, and the information is output to the control device 100.

The first power converter 71 performs bidirectional power conversion from the secondary battery 30 side to the intermediate DC zone 81 side and from the intermediate DC zone 81 side to the secondary battery 30. The first power converter 71 may serve as a DC-DC converter. The first power converter 71 is capable of converting a voltage by performing a switching operation.

Specifically, the first power converter 71 can step up the discharge power of the secondary battery 30 which is supplied to the intermediate DC zone 81 on the load side of the first power converter 71. Discharge power of the secondary battery 30 is supplied to the intermediate DC zone 81 as DC power. Further, the first power converter 71 can step down the power supplied to the intermediate DC zone 81 and supply it to the secondary battery 30. The electric power supplied to the intermediate direct current zone 81 is supplied to the secondary battery 30 as DC power. The operation of the first power converter 71 is controlled by the control device 100. The first power converter 71 may be a known power converter as long as it has the above function.

Here, with reference to FIG. 2, the configuration of the first power converter 71 will be described in more detail. FIG. is a schematic diagram illustrating an instance of a configuration of the first power converter 71 according to the example.

Figure 2:
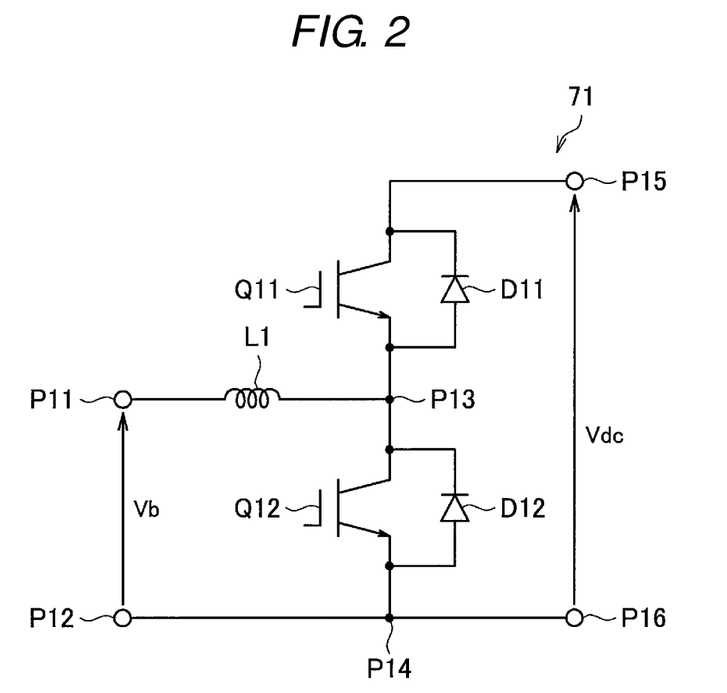
FIG. 2 is a schematic diagram illustrating an example of a configuration of a first power converter according to the example.

For instance, as illustrated in FIG. 2, the first power converter 71 is provided with an inductor L1, a switching element Q11, a switching element Q12, a diode D11, and a diode D12. The switching element Q11 is connected in parallel with the diode D11, and the switching element Q12 in parallel with the diode D12. An open end P11, an open end P12, an open end P15, and an open end P16 of the first power converter 71 are connected to the high voltage side of the secondary battery 30, the low voltage side of the secondary battery 30, the high voltage side of the intermediate DC zone 81, and the low-voltage side of the intermediate direct-current zone 81, respectively. For the switching elements Q11 and Q12, MOSFET (Metal Oxide Semiconductor Field Effect Transistor) or IGBT (Insulated Gate Bipolar Transistor) or the like may be used.

A connector P13 between the open end P11 and the open end P15 and the connector P14 between the open end P12 and the open end P16 are connected via the switching element Q12 and the diode D12. The diode D12 regulates the direction of the current in one direction from the connector P14 to the connector P13. Further, the open end P11 and the connector P13 are connected via the inductor L1. Further, the connector P13 and the open end P15 are connected via the switching element Q11 and the diode D11. The diode D11 regulates the direction of the current in one direction from the connector P13 to the open end P15.

The first power converter 71 turns off the switching element Q11 and by performing a switching operation (in other words, an operation in which ON and OFF are repeated) on the switching element Q12, the discharge power of the secondary battery 30 is stepped up from the battery voltage Vb and can be supplied to the intermediate DC zone 81 side. In this case, magnetic energy is accumulated in the inductor L1 when the switching element Q12 is ON, and magnetic energy is released from the inductor L1 when the switching element Q12 is OFF. The switching operation of the switching element Q12 is controlled by the control device 100. Further, the control device 100 can control the step-up ratio by controlling the duty ratio of the switching operation of the switching element Q12.

Further, the first power converter 71 turns off the switching element Q12, and by performing a switching operation on the switching element Q11, the first power converter 71 steps down the power, which is supplied to the intermediate DC zone 81, and supplies the stepped-down power to the secondary battery 30 side from the DC stage voltage Vdc. In this case, magnetic energy is accumulated in the inductor L1 when the switching element Q11 is ON state, while magnetic energy is released from the inductor L1 when the switching element Q11 is OFF state. The switching operation of the switching element Q 11 is controlled by the control device 100. Further, the control device 100 controls the step-down ratio by controlling the duty ratio of the switching operation of the switching element Q11.

Here, by stopping the switching operation, the first power converter 71 can directly connect to the intermediate DC zone 81, which is on the load side of the first power converter 71, and the secondary battery 30. For instance, in the example illustrated in FIG. 2, the first power converter 71 can directly connect to the intermediate DC zone 81 and the secondary battery 30 by turning on the switching element Q11 and turning off the switching element Q12.

The fuel cell 20 can generate electric power by reacting hydrogen gas and oxygen gas. The fuel cell 20 is connected to the hydrogen tank 10 via a pipe 12, and the hydrogen tank 10 is filled with, for instance, high-pressure hydrogen to be supplied to the fuel cell 20. Hydrogen gas is supplied from the hydrogen tank 10 to the fuel cell 20 by a motor pump (not shown) or the like. Further, air in the form of oxygen gas is supplied to the fuel cell 20 by a compressor or the like (not shown).

Specifically, the fuel cell 20 can generate electric power of a lower voltage than the battery voltage Vb, which is the voltage of the secondary battery 30. The generated power from the fuel cell 20 can be used to charge the secondary battery 30. When charging the secondary battery 30, the generated power from the fuel cell 20 is supplied to the secondary battery 30 via the intermediate DC zone 81. The operation of the fuel cell 20 is controlled by the control device 100. Specifically, the control device 100 controls an output Pfc of the fuel cell 20 by controlling the amounts of hydrogen gas and oxygen gas supplied to the fuel cell 20. The fuel cell 20 may be a known fuel cell 20 in case of having the above function.

The second power converter 72 performs unidirectional power conversion from the fuel cell 20 side to the intermediate DC zone 81 side. The second power converter 72 may serve as a DC-DC converter. The second power converter 72 converts voltage by performing a switching operation.

Specifically, the second power converter 72 steps up the generated power from the fuel cell 20 and supplies the stepped-up power to the intermediate DC zone 81, which is the load side, from the second power converter 72. The generated power from the fuel cell 20 is supplied to the intermediate direct current zone 81 as DC power. The operation of the second power converter 72 is driven and controlled by the control device 100. The second power converter 72 may be a known power converter as long as it has the above function.

Here, with reference to FIG. 3, the configuration of the second power converter 72 will be described in more detail. FIG. is a schematic diagram illustrating an instance of a configuration of the second power converter 72 according to the example.

Figure 3:
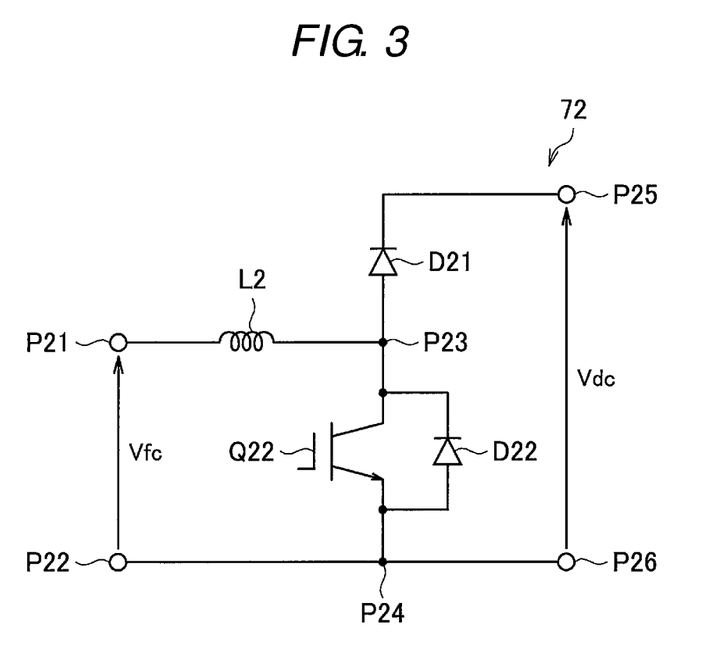
FIG. 3 is a schematic diagram illustrating an example of a configuration of a second power converter according to the example.

For instance, as illustrated in FIG. 3, the second power converter 72 is provided with an inductor L2, a switching element Q22, a diode D21, and a diode D22. The diode D22 is connected in parallel with the switching element Q22. An open end P21, an open end P22, an open end P25, and an open end P26 of the second power converter 72 are connected to the high voltage side of the fuel cell 20, the low voltage side of the fuel cell 20, the high voltage side of the intermediate direct current zone 81, and the low voltage side of the zone 81, respectively. For the switching element Q22, a MOSFET (Metal Oxide Semiconductor Field Effect Transistor) or IGBT (Insulated Gate Bipolar Transistor) may be used.

A connector P23 between the open end P21 and the open end P25 and a connector P24 between the open end P22 and the open end P26 are connected via the switching element Q22 and the diode D22. The diode D22 regulates the direction of the current in one direction from the connector P24 to the connector P23. Further, the open end P21 and the connector P23 are connected via the inductor L2. Further, the connector P23 and the open end P25 are connected via the diode D21. The diode D 21 regulates the direction of the current in one direction from the connecting portion P 23 to the open end P 25.

The second power converter 72 can step up the generated power from the fuel cell 20 from the fuel cell voltage Vfc and supply the stepped-up power to the intermediate DC zone 81 by performing the switching operation on the switching element Q22. In this case, magnetic energy is accumulated in the inductor L2 when the switching element Q22 is ON, while magnetic energy is released from the inductor L2 when the switching element Q22 is OFF. The switching operation of the switching element Q22 is controlled by the control device 100. Further, the control device 100 can control the step-up ratio by controlling the duty ratio of the switching operation of the switching element Q22.

The control device 100 includes a CPU (i.e., Central Processing Unit), which is an arithmetic processing unit, a ROM (i.e., Read Only Memory), which is a storage element that stores programs used by the CPU and operation parameters and the like, and RAM (i.e., Random Access Memory), which is a storage element that temporarily stores parameters and the like with being changed appropriately in the execution of the CPU.

The control device 100 controls the operation of each device constituting the battery system 1. For instance, the control device 100 controls the operation of each device by outputting an operation instruction using an electric signal to each device that is a control target. Specifically, the control device 100 can control the operations of the fuel cell 20, the first power converter 71, the second power converter 72, and the third power converter 73.

The control device 100 receives the information output from each device. Communication between the control device 100 and each device is performed by using, for instance, CAN (Controller Area Network) communication. For instance, the control device 100 receives information output from the battery management device 35. Further, the control device 100 may receive information indicating acceleration/deceleration command amount Acc of the electric vehicle and the vehicle speed V. In that case, a sensor capable of detecting the acceleration/deceleration command amount Acc and the vehicle speed V, for instance, can be provided in the electric vehicle. The acceleration/deceleration command amount Acc is, for instance, a value corresponding to the accelerator opening degree or the amount of brake pedal depression. Further, the functions of the control device 100 according to the example may be divided by a plurality of control devices, in which case the plurality of control devices may be connected to each other via a communication bus such as CAN.

Here, by way of a charging control mode using the generated power from the fuel cell 20, being executed by the control device 100 according to the exemplified control mode, it is possible to improve the charging efficiency of the secondary battery 30. Details of such a control device 100 will be described in the next section.

2. CONTROL DEVICE

Subsequently, with reference to FIGS. 4 to 7, the details of the control device 100 according to the example will be described.

[2-1. Functional Configuration]

Figure 4:
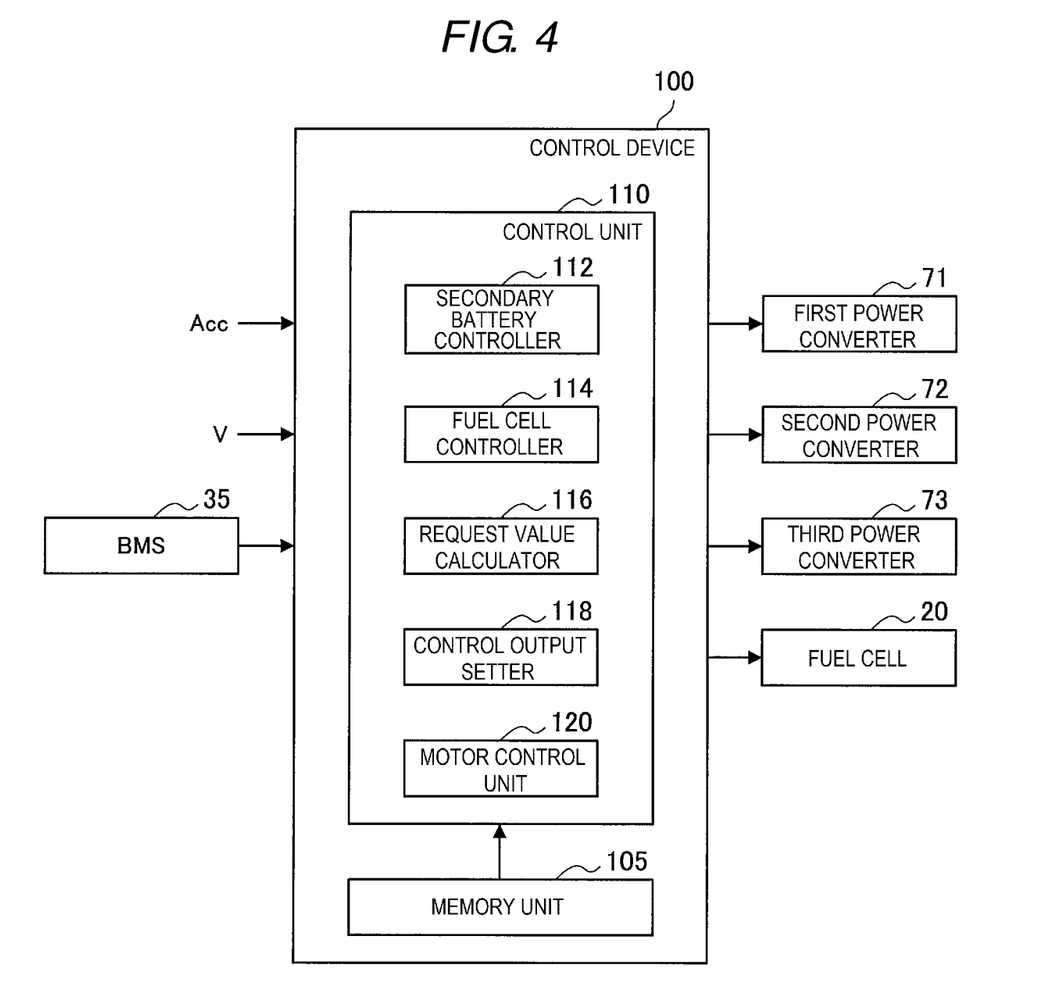
FIG. 4 is a block diagram illustrating an example of a functional configuration of a control device according to the example.

First, the functional configuration of the control device 100 according to the example will be described with reference to FIGS. 4 to 6. FIG. 4 is a block diagram illustrating an instance of a functional configuration of the control device 100 according to the example.

For instance, as illustrated in FIG. 4, the control device 100 includes a control unit 110 and a memory unit 105.

The memory unit 105 stores data referred to in each procedure performed by the control device 100. For instance, the memory unit 105 may store the processing result of each procedure performed by the control device 100. Further, the memory unit 105 may store information acquired from the external device by the control device 100.

The control unit 110 is capable of executing each control mode related to the supply of power in the battery system 1 by controlling the operation of each device constituting the battery system 1. Specifically, the control unit 110 can execute the charging control mode in which the secondary battery 30 is charged using the generated power from the fuel cell 20, a power supply control mode in which the discharged power of the secondary battery 30 is supplied to the load which is comprised of the third power converter 73 and the drive motor 40, and a regenerative charging control mode in which the secondary battery 30 is charged using the regeneratively generated power from the drive motor 40, respectively.

Specifically, the charging control mode, the power supply control mode, and the regenerative charging control mode executed by the control unit 110 are enabled by the respective functional units included in the control unit 110. Hereinafter, first, after an overview of the functional units of the control unit 110, each control mode performed by the control unit 110 will be described in detail.

The control unit 110, for instance, as illustrated in FIG. 4, is provided with a secondary battery controller 112, a fuel cell controller 114, a request command value calculator 116, a control output setter 118, and a motor controller 120.

By controlling the operation of the first power converter 71, the secondary battery controller 112 controls the supply of power between the secondary battery 30 side and the intermediate DC zone 81 side which is the load side of the first power converter 71.

Specifically, the secondary battery controller 112 controls the operation of the switching element Q11 and the switching element Q12 of the first power converter 71. In this way, the secondary battery controller 112 can step up the discharge power of the secondary battery 30 from the battery voltage Vb and supply it to the intermediate DC zone 81 side. In this case, the secondary battery controller 112, by controlling the step-up ratio, controls the DC stage voltage Vdc. Further, the secondary battery controller 112 can step down the power supplied to the intermediate DC zone 81 from the DC stage voltage Vdc, and supply the stepped down power to the secondary battery 30 side. In this case, by controlling the step-down ratio, the secondary battery controller 112 controls the voltage supplied to the secondary battery 30 so that the voltage is equal to the charging voltage to be chargeable by the secondary battery 30. Further, the secondary battery controller 112 can be directly connected to the secondary battery 30 and the intermediate DC zone 81 by stopping the switching operation of the first power converter 71.

By controlling the fuel cell 20 and the operation of the second power converter 72, the fuel cell controller 114 controls the supply of power from the fuel cell 20 to the intermediate DC zone 81 which is on the load side of the second power converter 72.

Specifically, the fuel cell controller 114 controls the amount of hydrogen gas and oxygen gas supplied to the fuel cell 20. In this way, the fuel cell controller 114 can control the output Pfc of the fuel cell 20.

Further, the fuel cell controller 114 controls the operation of the switching element Q22 of the second power converter 72. In this way, the fuel cell controller 114 can step up the generated power from the fuel cell 20 from the fuel battery voltage Vfc and supply it to the intermediate DC zone 81 side. In this case, the fuel cell controller 114 controls the DC stage voltage Vdc by controlling the step-up ratio.

The request command value calculator 116 calculates a request command value of the driving force to the electric vehicle based on the acceleration/deceleration command amount Acc. The request command value calculator 116 outputs information indicating the request command value calculated for the driving force to the control output setter 118. For instance, the request command value calculator 116 may calculate the request command value by referring to a request command value map that defines the relationship between the deceleration command amount Acc and the request command value of the driving force. The request command value map is stored in the memory unit 105 in advance.

The control output setter 118 sets the target value for the output of the drive motor 40 based on the request command value calculated by the request command value calculator 116 and the vehicle speed V. Further, the control output setter 118 outputs information indicating the target value of the output of the drive motor 40 to the motor controller 120. For instance, the control output setter 118 refers to the output characteristic map that defines the relationships between the driving force request command value and the vehicle speed V, and the target value for the output of the drive motor 40, so as to set the target value within the maximum output range in accordance with the basic performance of the drive motor 40. The output characteristic map is stored in the memory unit 105 in advance.

By controlling the operation of the third power converter 73, the motor controller 120 controls the supply of electric power between the intermediate DC zone 81 side and the drive motor 40 side, which are seen from the third power converter 73.

Specifically, the motor controller 120 controls the operation of the switching elements of the third power converter 73. In this way, the motor controller 120 can convert the DC power supplied to the intermediate DC zone 81 to AC power, and supply the converted power to the drive motor 40. In this case, the motor controller 120 can control the magnitude of power supplied to the drive motor 40 by controlling the switching operation of the switching elements. In this way, the motor controller 120 can control the output of the drive motor 40. Specifically, the motor controller 120 controls the output of the drive motor 40 so that the output meets a target value that is set by the control output setter 118.

Further, by controlling the operation of the switching elements of the third power converter 73, the motor controller 120 converts the AC power regenerated by the drive motor 40 into DC power and supplies the DC power to the intermediate DC zone 81. In this case, the motor controller 120 can control the magnitude of power supplied to the intermediate DC zone 81 by controlling the switching operation of the switching element. In this way, the motor controller 120 can control the generated power from the drive motor 40.

Next, each control mode performed by the control unit 110 will be described in detail.

(2-1-1. Charging Control Mode)

Based on the remaining capacity SOC of the secondary battery 30, the control unit 110 executes the charging control mode for charging the secondary battery 30 using the generated power from the fuel cell 20. For instance, when the remaining capacity SOC of the secondary battery 30 falls below a threshold value SOC_th, the control unit 110 starts the charging control mode. Specifically, the control unit 110 determines whether the remaining capacity SOC of the secondary battery 30 falls below the threshold value SOC_th, and if remaining capacity SOC of the secondary battery 30 is determined not to have fallen below the threshold value SOC_th, the control unit 110 starts the charging control mode.

Figure 5:
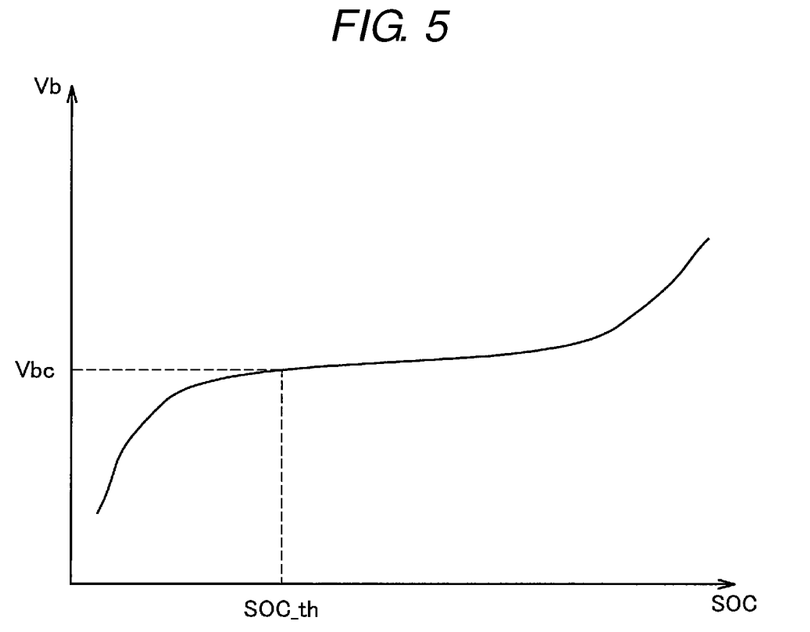
FIG. 5 is an explanatory diagram illustrating an example of a relationship between a remaining capacity SOC of a secondary battery and a battery voltage Vb.

FIG. 5 is an explanatory diagram illustrating an instance of a relationship between the remaining capacity SOC and the battery voltage Vb of the secondary battery 30. The battery voltage Vb, as illustrated in FIG. 5, decreases as the remaining capacity SOC decreases. Specifically, the threshold value SOC_th is set to the remaining capacity SOC at the point when the degree of decrease in the battery voltage Vb starts to increase significantly, which is caused by the decrease in the remaining capacity SOC in the process where the remaining capacity SOC decreases. The set value of the threshold value SOC_th may be stored in advance in the memory unit 105.

The fuel cell controller 114 according to the example, during the execution of the charging control mode, steps up a generated power from the fuel cell 20 to the level of the charging voltage for the secondary battery 30 by causing the second power converter 72 to operate the switching operation and to supply the stepped-up electric power to the intermediate DC zone 81 which is a load side of the second power converter 72. In this way, the DC stage voltage Vdc becomes the charging voltage.

Charging of the secondary battery 30 is enabled by supplying the voltage (Vb+ΔV), which is obtained by adding the voltage ΔV specifying the amount of charge to the battery voltage Vb, to the secondary battery 30. The higher the voltage ΔV, the higher the amount of charge of the secondary battery 30 (i.e., the charging power which charges the secondary battery 30). Therefore, the charging voltage is a voltage obtained by adding the voltage ΔV to the battery voltage Vb (Vb+ΔV). For instance, since the charging control mode is started when the remaining capacity SOC of the secondary battery 30 falls below the threshold value SOC_th, the initial charging voltage in the charging control mode is equal to the voltage (Vbc+ΔV) obtained by adding the voltage ΔV to the battery voltage Vbc when the remaining capacity SOC equals to the threshold value SOC_th, as illustrated in FIG. 5.

According to the present example, by stopping the switching operation of the first power converter 71, the secondary battery controller 112, at the time of executing the charging control mode, directly connects the intermediate DC zone 81, which is on the load side of the first power converter 71, and the secondary battery 30. The DC stage voltage Vdc becomes the charging voltage via control by the fuel cell controller 114. Consequently, by directly connecting the intermediate DC zone 81 and the secondary battery 30, the charging of the secondary battery 30 is enabled by using the generated power from the fuel cell 20.

Here, in the power supply control mode for supplying power to the drive motor 40, as described later, the discharge power of the secondary battery 30 is stepped up by the first power converter 71 and supplied to the intermediate DC zone 81. Consequently, according to the control at the time of executing the charging control mode in the example, the DC stage voltage Vdc can be lowered by comparing the DC stage voltage Vdc in the charging control mode with the DC stage voltage Vdc in the power supply control mode for supplying the power to the drive motor 40. In this way, it is possible to adequately reduce the step-up ratio of the second power converter 72 in the charging control mode. Consequently, the switching losses occurring in the second power converter 72 can be reduced. Further, by stopping the switching operation of the first power converter 71 in the charging control mode, occurrence of switching losses in the first power converter 71 can be prevented. Therefore, this improves efficiency of charging a secondary battery 30, using generated power from a fuel cell 20, in a battery system 1 that includes a secondary battery 30 and a fuel cell 20.

The fuel cell controller 114 may control the output Pfc of the fuel cell 20 at the start of the charging control mode so as to be equal to the reference output Pfc_std which was given priority to power generation efficiency Efc of the fuel cell 20. In this way, efficiency of charging the secondary battery 30 using generated power from the fuel cell 20 can be further improved.

Figure 6:
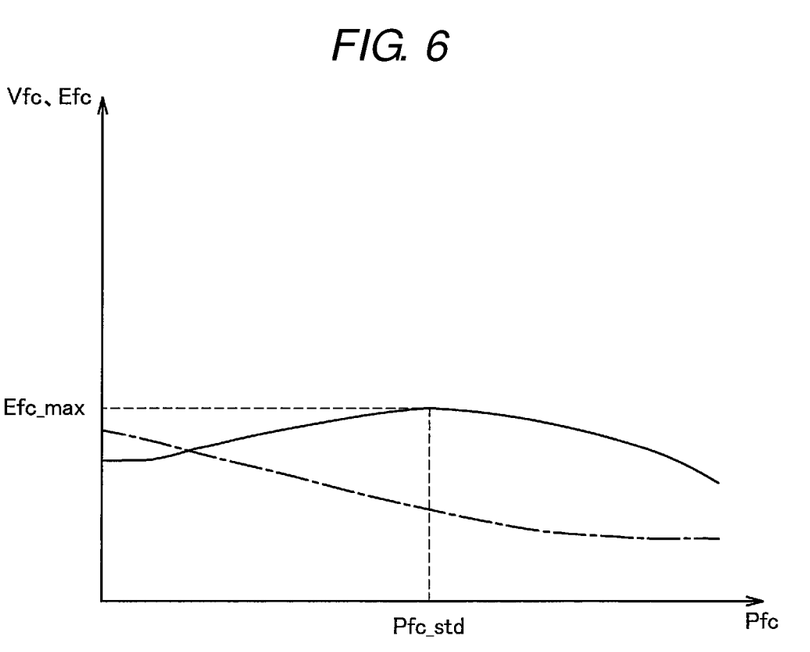
FIG. 6 is an explanatory diagram illustrating an example of relationships between the output Pfc of the fuel cell and the power generation efficiency Efc of the fuel cell, and between the output Pfc and the fuel cell voltages Vfc.

FIG. 6 is an explanatory diagram illustrating an example of the relationships between the output Pfc of the fuel cell and the power generation efficiency Efc of the fuel cell, and between the output Pfc and the fuel cell voltages Vfc. In FIG. 6, the power generation efficiency Efc and the fuel cell voltage Vfc are indicated with a solid line and a dash-dot line, respectively the power generation efficiency Efc of the fuel cell 20, as illustrated in FIG. 6, decreases after rising as the output Pfc of the fuel cell 20 increases. Specifically, the reference output Pfc_std is set to the highest output Pfc of the power generation efficiency Efc. The set value of the reference output Pfc_std may be stored in advance in the memory unit 105.

Further, the fuel cell voltage Vfc, as illustrated in FIG. 6, decreases as the output Pfc of the fuel cell 20 increases. Here, by reducing the output Pfc of the fuel cell 20 to a value smaller than the reference output Pfc_std, and raising the fuel cell voltage Vfc, the step-up ratio of the second power converter 72 may be further reduced. However, in such a case, the effect of reducing the power generation efficiency Efc with decreasing output Pfc is large compared to the effect of reducing switching losses which accompany the decrease of the step-up ratio of the second power converter 72. Thus, by making the output Pfc the reference output Pfc_std, efficiency of charging the secondary battery 30 using the generated power from the fuel cell 20 can be adequately improved.

After the start of the charging control mode, if the remaining capacity SOC of the secondary battery 30 decreases, the fuel cell controller 114 may control the output Pfc of the fuel cell 20 so as to be larger to the reference output Pfc_std. For instance, when the power supply control mode that supplies power to the drive motor 40 after the start of the charging control mode is intervened, the remaining capacity SOC may decrease. In such a case, by controlling the output Pfc of the fuel cell 20 so that it becomes large with respect to the reference output Pfc_std, it is possible to avoid depletion of the remaining capacity SOC since the remaining capacity SOC can be easily increased at an early stage.

(2-1-2. The Power Supply Control Mode)

Based on the acceleration-deceleration command amount Acc, the control unit 110 executes the power supply control mode for supplying the discharge power of the secondary battery 30 to the third power converter 73 and the drive motor 40, which constitute a load. Specifically, the control unit 110 determines whether to drive the drive motor 40 based on the request command value of the driving force which is calculated by the request command value calculator 116, and the power supply control mode is executed when it is determined that the drive motor 40 is to be driven.

Further, the control unit 110 may prioritize the power supply control mode over the charging control mode. For instance, the control unit 110 may intervene in the power supply control mode after the start of the charging control mode.

By starting the switching operation of the first power converter 71 in the power supply control mode, the secondary battery controller 112 steps up the discharge power of the secondary battery 30 to the voltage corresponding to the target value of the output of the drive motor 40 and supplies the discharge power to the intermediate DC zone 81, which is on the load side of the first power converter 71. In this way, it is possible to place the DC stage voltage to the voltage corresponding to the target value of the output of the drive motor 40.

By controlling the operation of the third power converter 73 in the power supply control mode, the motor controller 120 converts DC power supplied to the intermediate DC zone 81 to AC power and supplies it to the drive motor 40. Further, by controlling the operation of the third power converter 73, the motor controller 120 controls the output of the drive motor 40 so that the output meets the target value of the output of the drive motor 40 that was set by the control output setter 118

The fuel cell controller 114, at the time of the power supply control mode execution, if the output of the secondary battery 30 is insufficient for the request command value, the generated power from the fuel cell 20 may be supplied to the third power converter 73 and the drive motor 40, which together serve as a load. For instance, the request command value is the output of the secondary battery 30, which is requested to control the output of the drive motor 40, so that the output of the secondary battery 30 becomes the target value of the output of the drive motor 40 set by the control output setter 118. When the output of the secondary battery 30 is insufficient relative to the request command value, by supplying the generated power from the fuel cell 20 to the third power converter 73 and the drive motor 40, it is possible to control the output of the drive motor 40 so that it becomes the target value.

Specifically, in such a case, by performing the switching operation of the second power converter 72, the fuel cell controller 114 steps up the generated power from the fuel cell 20 to the voltage corresponding to target value of the output of the drive motor 40 and supplies the stepped-up power to the intermediate DC zone 81, which is on the load side of the second power converter 72. Further, the fuel cell controller 114 controls the output Pfc of the fuel cell 20 so as to be equal to or more than the shortfall with respect to the request command value for the output of the secondary battery 30.

(2-1-3. Regenerative Charging Control Mode) Based on the acceleration-deceleration command amount Acc, the control unit 110 executes regenerative charging control mode for charging the secondary battery 30 with regeneratively generated power from the drive motor 40. Specifically, the control unit 110 calculates the request command value for the braking force to the electric vehicle based on the acceleration/deceleration command amount Acc, determines whether to brake the electric vehicle based on the request command value of the braking force judgment, and executes the regenerative charging control mode if it is determined that braking is to be applied to the electric vehicle.

Further, the control unit 110 may prioritize the regenerative charging control mode over the charging control mode. For instance, after the start of the charging control mode, the control unit 110 may intervene in the regenerative charging control mode.

By controlling the operation of the third power converter 73 during execution of the regenerative charging control mode, the motor controller 120 converts the AC power regenerated by the drive motor 40 into DC power and supplies it to the intermediate DC zone 81. Further, by controlling the operation of the third power converter 73, the motor controller 120 controls the generated power of the drive motor 40.

By starting the switching operation of the first power converter 71, the secondary battery controller 112, at the time of executing the regenerative charging control mode, steps down the power supplied to the intermediate DC zone 81 to the charging voltage and supplies the stepped-down power to the secondary power converter 30. In this way, the charging of the secondary battery 30 is enabled with the regeneratively generated power from the drive motor 40.

[2-2. Operation]

Figure 7:
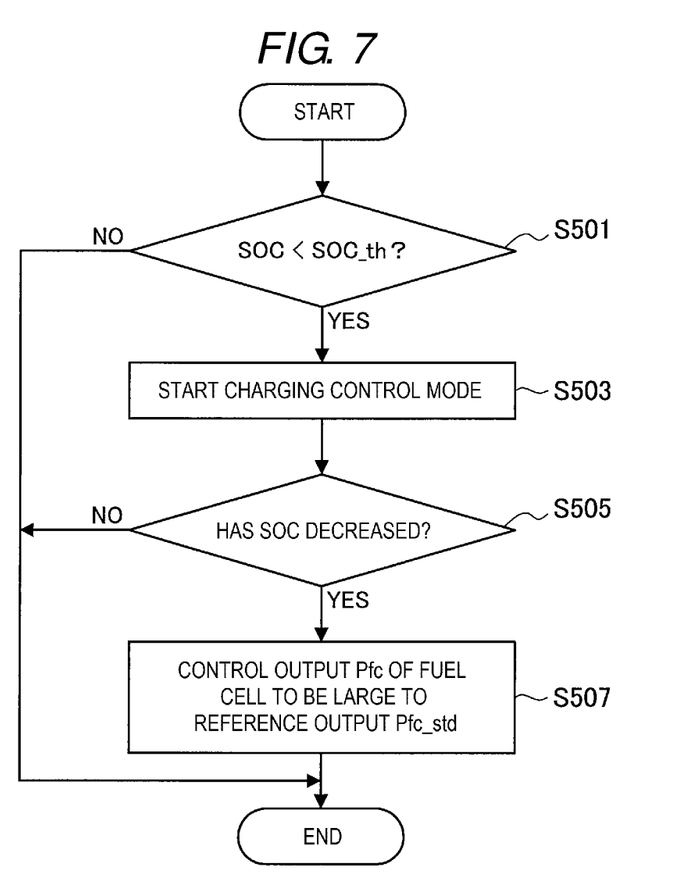
FIG. 7 is a flowchart illustrating the procedure in a charging control mode executed by the control device according to the example.

Next, with reference to the flowchart illustrated in FIG. 7, a description is given for the flow of a procedure in the charging control mode executed by the control device 100 according to the present example. FIG. 7 is a flowchart illustrating an instance of the flow of a procedure in the charging control mode executed by the control device 100 according to the example. The control device 100, for instance, repeatedly executes the process illustrated in FIG. 7 at predetermined time intervals.

In the example, as illustrated in FIG. 7, first, the control unit 110 determines whether the remaining capacity SOC of the secondary battery 30 falls below the threshold value SOC_th (step S501). If the remaining capacity SOC of the secondary battery 30 is determined not to have fallen below the threshold value SOC_th (step S501/NO), the procedure illustrated in FIG. 7 ends.

On the other hand, if the remaining capacity SOC of the secondary battery 30 is determined to have fallen below the threshold value SOC_th (step S501/YES), the control unit 110 starts the charging control mode (step S503). By starting the switching operation of the second power converter 72 during execution of the charging control mode according to the example, the fuel cell controller 114 steps up the generated power from the fuel cell 20 to the charging voltage, which is a voltage that can be charged by the secondary battery 30, and supplies the stepped up power to the intermediate DC zone 81, which is on the load side of the second power converter 72. Further, by stopping the switching operation of the first power converter 71, the secondary battery controller 112 directly connects to the intermediate DC zone 81, which is on the load side of the first power converter 71, and the secondary battery 30. In this way, while reducing the switching losses occurring in the second power converter 72 and preventing the occurrence of the switching losses in the first power converter 71, charging of the secondary battery 30 using the generated power from the fuel cell 20 can be carried out. Further, the fuel cell controller 114 controls the output Pfc of the fuel cell 20 at the start of the charging control mode so that the output Pfc is equal to the reference output Pfc_std.

Then, the fuel cell controller 114 determines whether the remaining capacity SOC of the secondary battery 30 has decreased (step S505) after the start of the charging control mode. If the remaining capacity SOC of the secondary battery 30 is not determined to have decreased (step S505/NO), the process illustrated in FIG. 7 is terminated, and the output Pfc of the fuel cell 20 is maintained at the reference output Pfc_std. On the other hand, if the remaining capacity SOC of the secondary battery 30 is determined to have decreased (step S505/YES), the fuel cell controller 114 controls the output Pfc of the fuel cell 20 so that the output Pfc becomes large relative to the standard output Pfc_std (step S507), and the process illustrated in FIG. 7 is terminated.

3. CONCLUSION

As described above, according to the control device 100 according to the example, by performing the switching operation of the second power converter 72 during execution of the charging control mode for charging the secondary battery 30 with generated power from the fuel cell 20, the fuel cell controller 114 steps up the generated power from the fuel cell 20 to the charging voltage, which is a voltage enabled to be charged by the secondary battery 30, and supplies the stepped-up power to the load side of the second power converter 72. Further, by stopping the switching operation of the first power converter 71, the secondary battery controller 112, at the time of executing the charging control mode, directly connects the load side of the first power converter 71 and the secondary battery 30. In this way, it is possible to adequately reduce the step-up ratio of the second power converter 72 in the charging control mode, and it is also possible to reduce the switching losses occurring in the second power converter 72. Further, by stopping the switching operation of the first power converter 71 in the charging control mode, occurrence of switching losses in the first power converter 71 can be prevented. Therefore, this improves efficiency of charging a secondary battery 30, using generated power from a fuel cell 20, in a battery system 1 that includes a secondary battery 30 and a fuel cell 20.

In the above description, although a battery system 1 installed in an electric vehicle was described as an example of a battery system according to the present invention, a battery system according to the present invention may be applied to devices or machines other than electric vehicles. For instance, a battery system according to the present invention may be installed on a railway or any other transport equipment provided with a fuel cell.

Further, in the above description, although the third power converter 73 and the drive motor 40 were described as an example of the load according to the present invention, a load of the present invention is not limited to the example. According to the present invention, the load may vary as appropriate depending on the device in which the battery system is installed provided it can consume power that is supplied.

Although a preferred example of the present invention has been described in detail with reference to the accompanying drawings, the present invention is not limited to the example. Provided a person has ordinary knowledge in the technical field to which the example of the present invention pertains, within the scope of the technical idea described in the claims, the example of the present invention is intended to cover various modifications and applications, and such modifications are intended to fall within the technical scope of the present invention.

Effect of the Invention

According to the examples described above, it is possible to improve efficiency of charging a secondary battery using generated power from a fuel cell in a battery system that includes a secondary battery and a fuel cell.

The invention claimed is:

1. A battery system control device, comprising:
a load;
a secondary battery that is connected to the load via a first power converter capable of converting a voltage by performing a switching operation, the secondary battery being capable of discharging power supplied to the load;
a fuel cell, being connected to the load, that is connected in parallel with the secondary battery and the first power converter, via a second power converter capable of converting a voltage by performing a switching operation, the fuel cell being capable of generating electric power of a low voltage as compared with a voltage of the secondary battery; and
a control unit capable of executing a charging control mode for charging the secondary battery using a generated power from the fuel cell,
wherein the control unit comprises:
a fuel cell controller configured to step up the electric power generated by the fuel cell to a voltage that is chargeable by the secondary battery, and to supply the stepped-up electric power to a load side of the second power converter by causing the second power converter to perform the switching operation during an execution of the charging control mode; and
a secondary battery controller configured to directly connect a load side of the first power converter and the secondary battery by stopping the switching operation of the first power converter during the execution of the charging control mode,
wherein, at a start of the charging control mode, the control unit controls an output of the fuel cell to become a reference output based on a power generation efficiency of the fuel cell,
wherein, based on a decrease of a remaining capacity of the secondary battery after the start of the charging control mode, the control unit sets the output of the fuel cell,
wherein the fuel cell controller controls the output of the fuel cell to avoid a depletion of the remaining capacity of the secondary battery,
wherein, after the start of the charging control mode, the control unit is configured to execute a power supply control mode for supplying power discharged by the secondary battery to the load, and depending upon a demand of the load, the control unit prioritizes the power supply control mode over the charging control mode, and
wherein the fuel cell controller controls the output of the fuel cell to be maintained at the reference output when a remaining capacity of the secondary battery has not decreased, and the fuel cell controller controls the output of the fuel cell to be larger than the reference output when the remaining capacity of the secondary battery decreases after the start of the charging control mode.

2. The battery system control device according to claim 1, wherein the control unit starts the charging control mode when the remaining capacity of the secondary battery falls below a predetermined value.

3. The battery system control device according to claim 1, wherein the fuel cell controller controls the output of the fuel cell, at the start of the charging control mode, to be the reference output that prioritizes the power generation efficiency of the fuel cell.

4. The battery system control device according to claim 2, wherein the fuel cell controller controls the output of the fuel cell, at the start of the charging control mode, to be the reference output that prioritizes the power generation efficiency of the fuel cell.

5. The battery system control device according to claim 1, wherein the fuel cell controller supplies the power generated by the fuel cell to the load when the output of the secondary battery is insufficient with respect to a request command value during the execution of the power supply control mode.

6. The battery system control device according to claim 2, wherein the fuel cell controller supplies the power generated by the fuel cell to the load when the output of the secondary battery is insufficient with respect to a request command value during the execution of the power supply control mode.

7. The battery system control device according to claim 3, wherein the fuel cell controller supplies the power generated by the fuel cell to the load when the output of the secondary battery is insufficient with respect to a request command value during the execution of the power supply control mode.

8. The battery system control device according to claim 4, wherein the fuel cell controller supplies the power generated by the fuel cell to the load when the output of the secondary battery is insufficient with respect to a request command value during the execution of the power supply control mode.

9. The battery system control device according to claim 1, wherein the load includes a drive motor capable of outputting a power for driving a drive wheel of an electric vehicle.

10. The battery system control device according to claim 2, wherein the load includes a drive motor capable of outputting a power for driving a drive wheel of an electric vehicle.

11. The battery system control device according to claim 3, wherein the load includes a drive motor capable of outputting a power for driving a drive wheel of an electric vehicle.

12. The battery system control device according to claim 4, wherein the load includes a drive motor capable of outputting a power for driving a drive wheel of an electric vehicle.

13. A battery system, comprising:
a load;
a secondary battery that is connected to a load via a first power converter capable of converting a voltage by performing a switching operation, the secondary battery being capable of discharging power supplied to the load;
a fuel cell, being connected to the load, that is connected in parallel with the secondary battery and the first power converter, via a second power converter capable of converting a voltage by performing a switching operation, the fuel cell being capable of generating electric power of a low voltage as compared with a voltage of the secondary battery; and
a control device capable of executing a charging control mode for charging the secondary battery using a generated power from the fuel cell,
wherein the control device comprises:
a fuel cell controller configured to step up the electric power generated by the fuel cell to a voltage that is chargeable by the secondary battery, and to supply the stepped-up electric power to a load side of the second power converter by causing the second power converter to perform the switching operation during an execution of the charging control mode; and
a secondary battery controller configured to directly connect a load side of the first power converter and the secondary battery by stopping the switching operation of the first power converter during the execution of the charging control mode,
wherein, at a start of the charging control mode, the control device controls an output of the fuel cell to become a reference output based on a power generation efficiency of the fuel cell,
wherein, based on a decrease of a remaining capacity of the secondary battery after the start of charging control mode, the control device sets the output of the fuel cell,
wherein the fuel cell controller controls the output of the fuel cell to avoid a depletion of the remaining capacity of the secondary battery,
wherein, after the start of the charging control mode, the control device is configured to execute a power supply control mode for supplying power discharged by the secondary battery to the load, and depending upon a demand of the load, the control device prioritizes the power supply control mode over the charging control mode, and
wherein the fuel cell controller controls the output of the fuel cell is maintained at the reference output when a remaining capacity of the secondary battery has not decrease, and the fuel cell controller controls the output of the fuel cell to be larger than the reference output when the remaining capacity of the secondary battery decreases after the start of the charging control mode.

14. The battery system according to claim 13, wherein the control device starts the charging control mode when the remaining capacity of the secondary battery falls below a predetermined value.

* * * * *